United States Patent [19]

Kobayashi

[11] Patent Number: 5,117,137
[45] Date of Patent: May 26, 1992

[54] STEPPING MOTOR FOR USE IN A CAMERA WITH MULTIPLE SHUTTERS

[75] Inventor: Takumi Kobayashi, Tokyo, Japan

[73] Assignee: Asahi Kogaku Kogyo Kabushiki Kaisha, Tokyo, Japan

[21] Appl. No.: 574,455

[22] Filed: Aug. 29, 1990

[30] Foreign Application Priority Data

Sep. 1, 1989 [JP] Japan ............... 1-102931[U]

[51] Int. Cl.⁵ .................. H02K 37/04; G03B 9/20
[52] U.S. Cl. .................. 310/49 R; 310/254; 354/234.1; 354/236
[58] Field of Search ............ 310/49 R, 156, 201, 310/208, 214, 268, 162, 163, 164, 273, 194, 254; 354/234.1, 264, 265, 271.1, 236

[56] References Cited

U.S. PATENT DOCUMENTS

| | | | |
|---|---|---|---|
| 3,585,450 | 6/1971 | Lane | 317/13 |
| 3,969,642 | 7/1976 | Yoshino | 310/49 R |
| 4,026,651 | 5/1977 | Vitou | 354/236 |
| 4,696,559 | 9/1987 | Kondo | 354/234.1 |
| 4,702,583 | 10/1987 | Yoshino et al. | 354/234.1 |
| 4,782,353 | 11/1988 | Ogihara et al. | 354/234.1 |
| 4,918,480 | 4/1990 | Hori | |

FOREIGN PATENT DOCUMENTS 2054978 2/1981 United Kingdom .
2104734 3/1983 United Kingdom .

OTHER PUBLICATIONS

United Kingdom Search Report.

*Primary Examiner*—Steven L. Stephan
*Assistant Examiner*—E. To
*Attorney, Agent, or Firm*—Sandler, Greenblum & Bernstein

[57] ABSTRACT

A stepping motor unit includes an annular motor mount having a center opening, a rotor which is rotatably supported on the annular motor mount, and a pair of stators which are supported on the annular motor mount to cause the rotor to rotate due to magnetic force. The stators have linear coil holders for holding the coils, which are arranged substantially along the inner and outer peripheries of the annular motor mount.

12 Claims, 8 Drawing Sheets

STEPPING MOTOR FOR USE IN A CAMERA WITH MULTIPLE SHUTTERS

BACKGROUND OF THE INVENTION

1. Field of the Invention

The present invention relates to a stepping motor unit having a stepping motor which is mounted to an annular motor mount, for example in an automatic focus and exposure camera.

2. Description of the Related Art

In an automatic focus and exposure camera in which the focus adjustment and the exposure control are successively effected in accordance with the shutter release operation, a focusing lens is moved to a focused position by a stepping motor in association with the shutter releasing operation. Then, a lens shutter is driven by the stepping motor. The stepping motor usually has a rotor consisting of a cylindrical double-pole permanent magnet and a plurality of stators having coils, so that the rotor is located between the stators. The magnetic poles of the coils change in accordance with pulse signals input thereto to rotate the rotor through a predetermined number of steps.

Upon incorporating the stepping motor in an automatic focus and exposure camera, the stepping motor is usually mounted to an annular motor mount provided in a lens barrel. The stators are usually located on the opposite sides of the rotor in a linear arrangement in which the stators are aligned along a line or in an arch-form arrangement in which the stators are located along a circle.

However, in the former type of arrangement, since the stators are aligned along a line on the annular (circular) motor mount, a compact and practical arrangement of the stators not be realized.

On the other hand, in the latter type of arrangement, since the stators are formed archwise, coil holding portions on which the coils are provided are also formed in the shape of an arch, and it is very difficult to effectively wind the coils on the corresponding arch-shaped bobbins. This results in a large size but decreased number of coil turns.

SUMMARY OF THE INVENTION

The primary object of the present invention is to provide a stepping motor unit having a stepping motor in which the stators can be practically and effectively arranged along the contour of an annular motor mount to make it possible to effectively wind the coils on the respective bobbins.

To achieve the object mentioned above, according to the present invention, there is provided a stepping motor unit comprising an annular motor mount having an inner periphery which defines a central opening and an outer periphery which is spaced from the inner periphery by a constant distance. A rotor which is rotatably supported on the annular motor mount and a pair of stators which are supported on the annular motor mount are provided to cause the rotor to rotate due to a magnetic force. The stators are provided with linear coil holders for holding coils and which are arranged substantially along the inner and outer peripheries of the motor mount.

With this arrangement, since the pair of stators are effectively arranged along the contour of the annular motor mount, the apparatus can be made compact and small. Furthermore, since the coil holders extend linearly, the bobbins can be of linear-shape, so that the coils which are effectively wound on the bobbins can be easily assembled with the stators.

BRIEF DESCRIPTION OF THE DRAWINGS

The invention will be described below in detail with reference to the accompanying drawings, in which.

DESCRIPTION OF THE PREFERRED EMBODIMENTS

Figure 1:
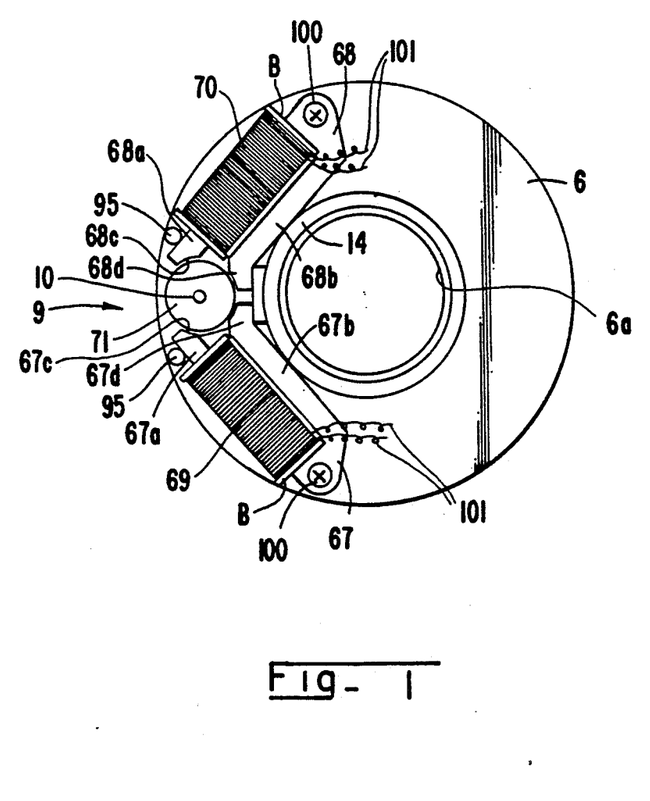
FIG. 1 is a front elevational view of a stepping motor unit according to the present invention.
Figure 2:
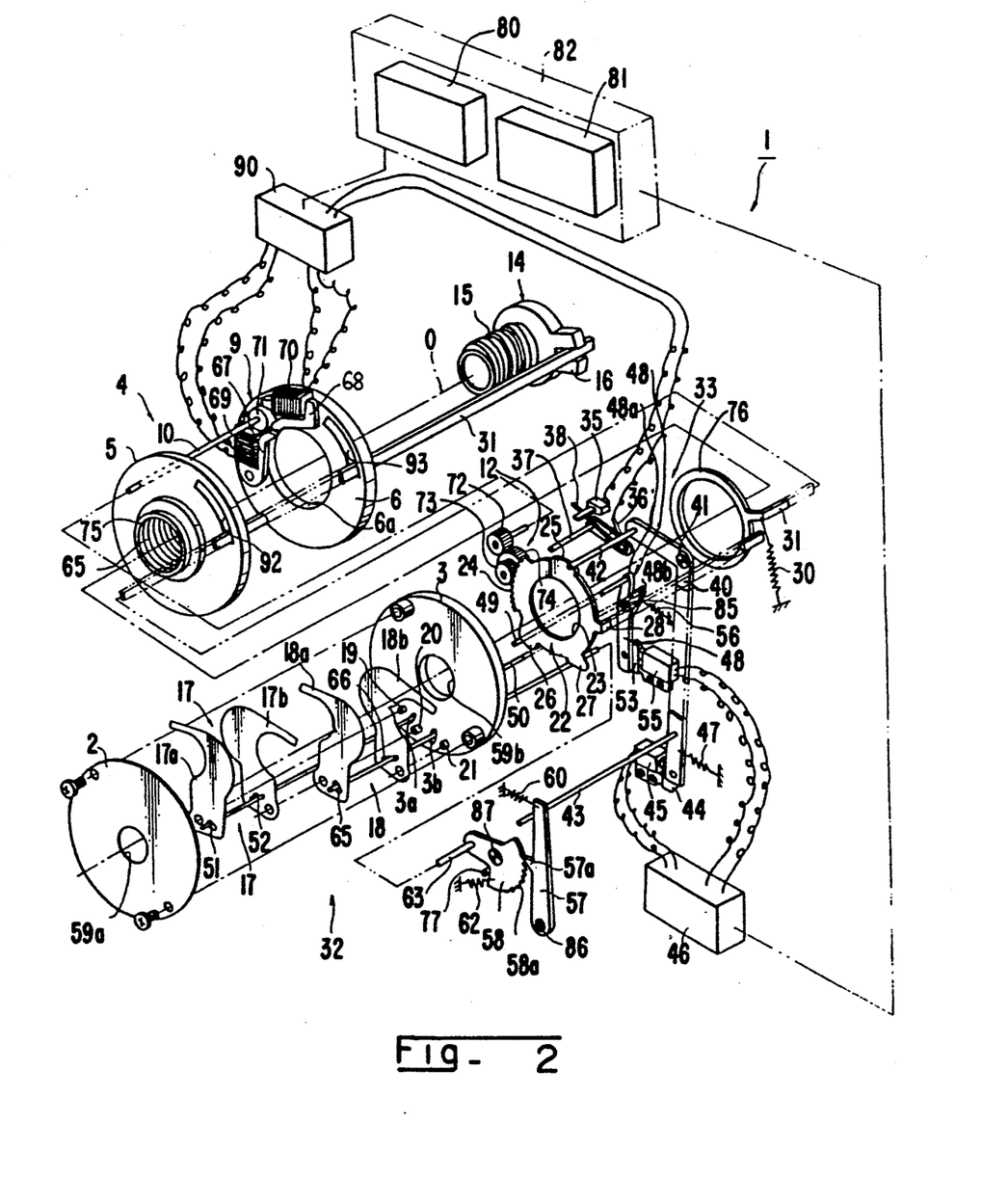
FIG. 2 is an exploded perspective view of a shutter device to which the stepping motor unit of the present invention is applied.

FIG. 1 shows a stepping motor unit having a stepping motor 9 of the present invention. FIG. 2 shows an exploded perspective view of a shutter device 1 to which the stepping motor 9 of the present invention is incorporated.

The shutter device 1 is housed in a photographing lens barrel (not shown) and has a release portion 32, a drive portion 33, a drive mechanism holding block 34 and a focus adjusting lens barrel 14.

The release portion 32 has annular bases 2 and 3 having holes 59a and 59b centered on the optical axis 0. A first sector mechanism 17 having a pair of sector blades 17a and 17b and a second sector mechanism 18 having a pair of sector blades 18a and 18b are provided between the two annular bases 2 and 3.

The annular base 3 has shafts 19, 20 and 21. The sector blade 17a is rotatably mounted to the shaft 19, and the sector blade 18b is rotatably mounted to the shaft 21. The sector blades 17b and 18a are rotatably mounted to the shaft 20.

The drive portion 33 has an operational plate 22 which has a center hole 23. Around the operational plate 22 are provided a switch lever 36 which actuates a start switch 35, a lever member 40, an operational ring 76, a sector lever 48 and a sector association lever 57, etc.

The hole 23 of the operational plate 22 has a center on the optical axis 0. The operational plate 22 is provided on its outer periphery with a gear 24, a cam portion 25, an operational lever 28 and cams 27 and 26 in this order.

Figure 3:
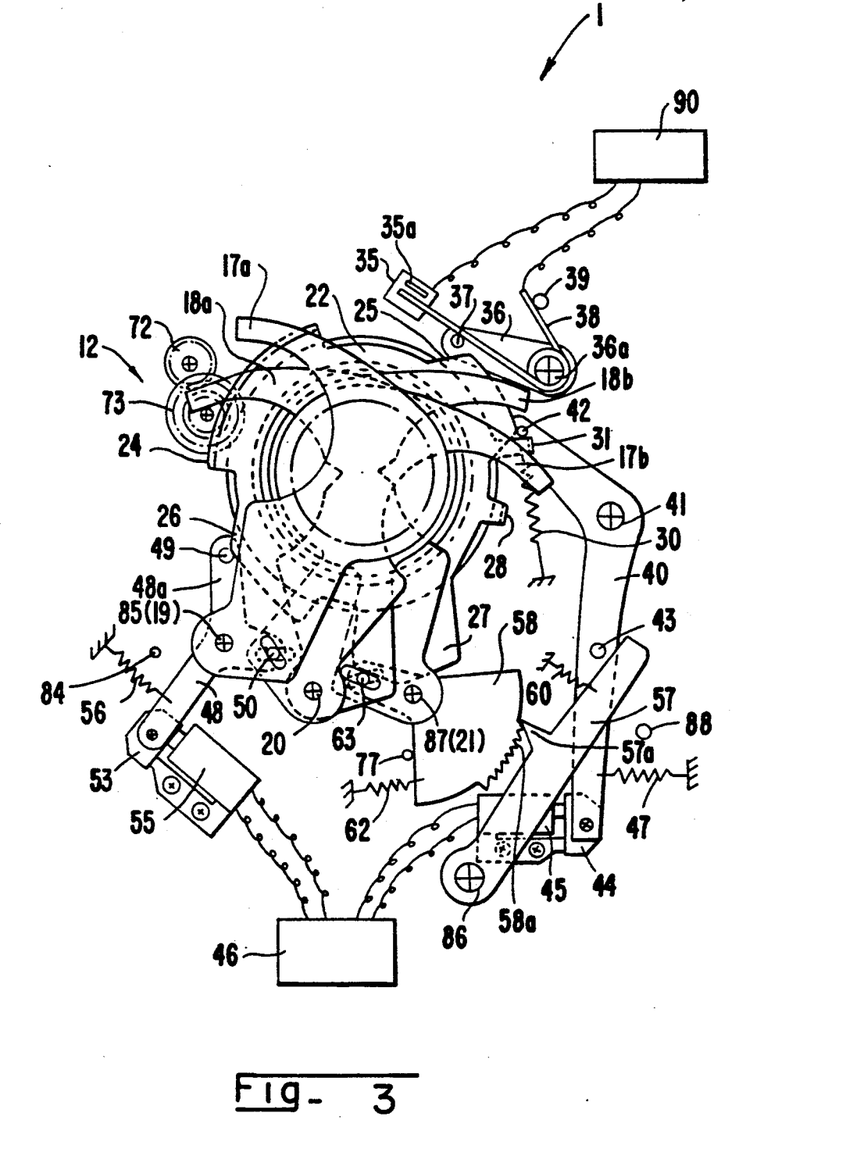
FIGS. 3 through 7 are front elevational views of a shutter device shown in FIG. 2, shown in different operational positions; and, FIG. 8 is a timing chart of various elements of a shutter device shown in FIG. 2.

The start switch 35 has a switch lever 36 (FIG. 3). The switch lever 36 rotates about a shaft 36a about which a torsion spring 38 is provided. The torsion spring 38 bears at its one end against an abutment bar 37 and at its opposite end against a pin 39 provided on the camera body. Thus the switch lever 36 is continuously biased in the counterclockwise direction by the torsion spring to engage the abutment bar 37 against the cam portion 25. The switch lever 36 rotates in the clockwise and counterclockwise directions in accordance with the cam profile of the cam portion 25. When the switch lever 36 rotates in the clockwise direction, the one end of the spring 38 comes into contact with the terminal 35a of the start switch 35 to turn the switch 35 ON. The opposite ends of the torsion spring 38 are connected to lead wires connected to a motor control circuit 90.

The lever member 40 is pivoted about the shaft 41 and has at its one end an operational bar member 42 which is guided by the cam member 25 to rotate in the clockwise and counterclockwise directions. The lever member 40 has, at its opposite end a lateral bar member 43 and an armature 44. An electromagnet 45 for the second sector mechanism is provided to correspond to the armature 44. The electromagnet 45 is connected to an electromagnet control circuit 46. A spring 47 is connected to the lever member 40 behind the armature 44 to bias the latter in the counterclockwise direction.

The sector lever 48 has a bifurcated portion 48 having arms 48a and 48b above the pivot shaft 85. The operational bar 49 is mounted to one of the bifurcated arms, e.g. the arm 48a, and a longer operational bar 50 is mounted to the other arm 48b.

The operational bar 49 bears against the cam portion 26 of the operational plate 22. The longer operational bar 50 extends through an elongated hole 3a formed in the annular base 3 and elongated holes 51 and 52 formed in the sector blades 17a and 17b, respectively.

In the initial position of the operational plate 22, the operational bar 49 is placed on the most raised (highest) portion of the cam portion 26, and accordingly, the sector lever 48 rotates in the counterclockwise direction against a spring 56. The armature 53 attached to the sector lever 48 below the shaft 85 is moved to a position in which the armature is attracted by the electromagnet 55 for the first sector mechanism. At the same time, since the upward force is applied to the elongated holes 51 and 52 of the sector blades 17a and 17b by the operational bar 50, the sector blade 17a and the sector blade 17b are rotated in the counterclockwise direction and the clockwise direction to close the first sector mechanism 17, respectively.

An engaging lever 57 is provided on the side of the lever member 40. The engaging lever 57 is rotatably supported to pivot about a shaft 86 at one end of the lever 57 and is biased by a spring 60 at the opposite end of the lever 57 in the counterclockwise direction. A sector association lever 58 is rotatably supported to pivot about a shaft 87 to be positioned to opposite a ratchet pawl 57a of the engaging lever 57. The sector association lever 58 has serrated ratchet teeth 58a which are engaged by a ratchet pawl 57a. The sector association lever 58 is biased by a second spring 62 in the clockwise direction. The angular displacement of the sector association lever 58 is restricted by a stop 77 provided on the camera body.

The sector association lever 58 has a sector association bar member 63 which laterally projects therefrom. The association bar member 63 extends through the elongated hole 3b of the annular base 3 and the elongated holes 65 and 66 of the sector blades 18a and 18b, respectively. When the association bar member 63 is pushed down by the cam portion 27 which moves in accordance with the rotation of the operational plate 22, the sector blades 18a and 18b are pushed down through the elongated holes 65 and 66. As a result, the sector blades 18a and 18b are rotated in the clockwise direction and the counterclockwise direction to open the second sector mechanism 18, respectively.

The drive mechanism holding block 4 has an intermediate frame 5 and an annular motor mount 6. The intermediate frame 5 is provided on its center portion with a female thread portion (threaded hole) 65. The annular motor mount 6 has an inner periphery which defines a center opening 6a which in turn defines the photographing opening of the camera and an outer periphery which is spaced from the inner periphery by a constant distance.

A stepping motor 9 is mounted to the motor mount 6. The stepping motor 9 has a rotor 71 which is composed of a cylindrical double-pole permanent magnet and a pair of stators 67 and 68 which rotate the rotor 71 step by step due to the varying magnetic poles of the magnetic force generating portions 67c and 68c. The stators 67 and 68 have linear coil holders (rods) 67a and 68 which form the magnetic force generating portions 67c and 68c at their front ends that of opposed to the rotor 71. The stators 67 and 68 have linear outer contact portions (linear levers) 67b and 68b parallel with the coil holders 67a and 68a, respectively.

The rotor 71 is rotatably supported on the motor mount 6 and has a shaft 10 which extends parallel to the center axis of the opening 6a of the annular motor mount 6. The stators 67 and 68 are located in a line-symmetrical arrangement with respect to the rotor 71 located therebetween. Furthermore, the coil holders 67a and 68a of the stators 67 and 68 are placed between the inner and outer peripheries of the annular motor mount 6. Namely, the stators 67 and 68 are located generally in V-shape, so that the rotor 71 is located at the apex of "V". The linear inner contact portions 67b and 68b of the stators 67 and 68 are in contact with the outer periphery i.e. a male thread portion 15 which will be explained below) of the focus adjusting lens 14 which is inserted into the center opening 6a of the motor mount 6. The rear faces of the coil holders 67a and 68a bear against positioning pins 95 provided on the motor mount 6. The stators 67 and 68 are secured to the motor mount 6 by screws 100.

The rotor 71 constitutes a lens shutter mechanism which opens and closes the photographing opening 6a.

The magnetic force generating portions 67c and 68c formed at the front ends of the coil holders 67a and 68a are formed archwise along the outer periphery (i.e. circle) of the rotor 71. The front ends 67d and 68d of the inner contact portions 67b and 68b are bent inward, so that they do not interfere with the rotor 71. The linear coil holders 67a and 68a are inserted in corresponding coils 69 and 70 which are wound on the linear bobbins B and B to hold the bobbins. The coils 69 and 70 are connected to the motor drive control circuit 90 by lead wires 101.

Thus, the stepping motor 9 is effectively mounted to the motor mount 6. Since the coil holders 67a and 68a are in the form of straight rods, the bobbins B are also linear, and accordingly, the coils 69 and 70 can be easily and effectively wound on the respective bobbins B, B.

The output shaft 10 of the rotor 71 extends through the intermediate frame 5 and has at its front end a pinion 72 which is engaged by a pinion 74 which is in turn in mesh with a gear 73 of the operational plate 22. The pinions or gears 72, 73 and 74 constitute a reduction gear train 12.

The intermediate frame 5 and the motor mount 6 have arched grooves 92 and 93 extending along an imaginary circle having a center on the optical axis O. The intermediate frame 5 is provided on its center portion with a cylindrical portion (boss) 75 in which the operation ring 76 is fitted. An operational bar 31 provided on the operation ring 76 extends through the arched grooves 92 and 93 and is engaged in a bifurcated association arm 16 which is provided on the focus adjusting lens barrel 14 at the front end of the operational bar 31.

The focus adjusting lens 14 is provided on its outer periphery with a male thread portion 15 which is in mesh with the female thread portion 65 of the intermediate frame 5. Accordingly, when the stepping motor 9 is not driven, the focus adjusting lens 14 is rotated by a largest angular displacement in the clockwise direction by the spring 30 to retract the lens into an innermost position. On the other hand, when the stepping motor 9 is driven to rotate the operational plate 22 for example in the counterclockwise direction, a bent portion 28 of the operational plate 22 presses the operational lever 31 of the operation ring 76 after the lapse of a predetermined time. As a result, the operational lever 31 rotates along the profile of the arched grooves 92 and 93, so that the focus adjusting lens 14 is rotated in the same direction to be advanced.

The motor drive control circuit 90 and the electromagnet control circuit 46 are connected to an arithmetic operation circuit 82 which has therein a luminance (or brightness) detecting means 80 for detecting luminance data relating to an object to be photographed in accordance with the measurement of a photometer switch, and an object distance detecting means 81 for detecting an object distance data in accordance with an object distance switch (not shown). In FIG. 3, numeral 84 designates a pin which restricts the rotational movement of the sector lever 48 in the counterclockwise direction, and 88 a pin which restricts the rotational movement of the lever member 40 in the counterclockwise direction.

The shutter device 1 according to the present invention operates as follows (FIGS. 3 through 8).

In an initial position shown in FIG. 2 in which both the photometer switch and the object distance switch are tuned OFF, the electromagnet 55 for the first sector mechanism and the electromagnet 45 for the second sector mechanism are both deenergized, and the stepping motor 9 is not driven. Namely, the operational plate 22 is maintained at the initial angular position, and accordingly, the operational bar 49 rides on the most raised portion of the cam portion 26 to rotate the sector lever 48 in the counterclockwise direction. As a result, the operation bar 50 is rotated in the same direction to rotate the sector blades 17a and 17b in the counterclockwise direction and the clockwise direction respectively, to close the shutter thereby, to intercept and block the optical path.

In this state, since the bar member 63 is in contact with the lowermost portion of the cam member 27, the sector association lever 58 is rotated by the largest angular displacement in the clockwise direction by the second spring 62 to a position in which the angular displacement thereof is restricted by the stop 77. Consequently, the bar member 63 is moved in the elongated hole 3b of the annular base 3 toward the center of the annular base 3 to rotate the sector blades 18a and 18b to intercept the light path, thereby to close the shutter. The operational bar member 42 of the lever member 40 comes into contact with the end of the cam portion 25, so that the lever member 40 is rotated against the spring 47 in the clockwise direction. Since the bar member 43 releases the sector association bar 57, the lever 57 is rotated by the spring 60 in the counterclockwise direction, so that the ratchet pawl 57a bears against the sector association lever 58.

In this state, since there is a predetermined distance between the bent portion 28 of the operational plate 22 and the operational lever 31 of the operation ring 76, the operation ring 76 is fully rotated in the clockwise direction by the spring 30. As a result, the operational lever 31 is rotated in the same direction to come into contact with the ends of the arched grooves 92 and 93 of the intermediate frame 5 and the lens frame 6 in the clockwise direction in order to rotate the focus adjusting lens 14 by the largest angular displacement in the same direction. Thus, the lens is retracted into the innermost position.

The switch lever 36 is rotated in the counterclockwise direction when the abutment bar 37 rides on the lower portion of the cam portion 25, so that one end (contact point) of the spring 38 separates from the terminal 35a to keep the start switch 35 OFF.

When the photometer switch and the object distance switch are turned ON (i.e., when the release switch is pushed down by a half step), the arithmetic operation circuit 82 operates, so that the luminance data and the object distance data are arithmetically calculated by the luminance detecting means 80 and the object distance detecting means 81, respectively.

When the release switch is turned ON, a predetermined number of forward rotation pulses corresponding to the object luminance is sent to the stepping motor 9 from the motor drive control circuit 90 in accordance with the luminance data of the photometer means 80 to rotate the stepping motor 9 in the forward direction (clockwise direction). At the same time, the second electromagnet 45 (for the second sector mechanism) is energized in response to the signal from the electromagnet control circuit 46 in accordance with the arithmetic operation circuit 82 to attract the armature 44. Similarly, the electromagnet 55 is energized to attract the armature 53.

As a result, the lever member 40 is attracted at the opposite end thereof, so that it can not be rotated in the counterclockwise direction, even if the operational bar member 42 is disengaged from the cam portion 25. Similarly, the opposite end of the sector lever 48 is attracted, so that it can not be rotated in the clockwise direction even if the operational bar 49 is disengaged from the cam portion 26. Simultaneously, the stepping motor 9 receives a predetermined number of forward rotation pulses corresponding to the diaphragm value detected, based on the photometer data, so that the coils 69 and 70 are activated to rotate the rotor 71 in the clockwise direction.

When the rotor 71 causes the operational plate 22 to rotate in the clockwise direction through the reduction gear train 12, the cam portion 27 gradually pushes the sector association bar member 63 downward. As a result, the sector association bar member 63 is moved radially and outwardly in the elongated hole 3b of the annular base 3 to rotate the sector blade 18a and the sector blade 18b in the clockwise direction and the counterclockwise direction, respectively.

One step of the stepping motor 9 corresponds to one tooth of the ratchet teeth 58a of the sector association lever 58, which in turn corresponds to one diaphragm value. Therefore, the rotation of the stepping motor 9 by a predetermined number of steps causes the second sector mechanism 18 to open to obtain a desired exposure value.

Figure 4:
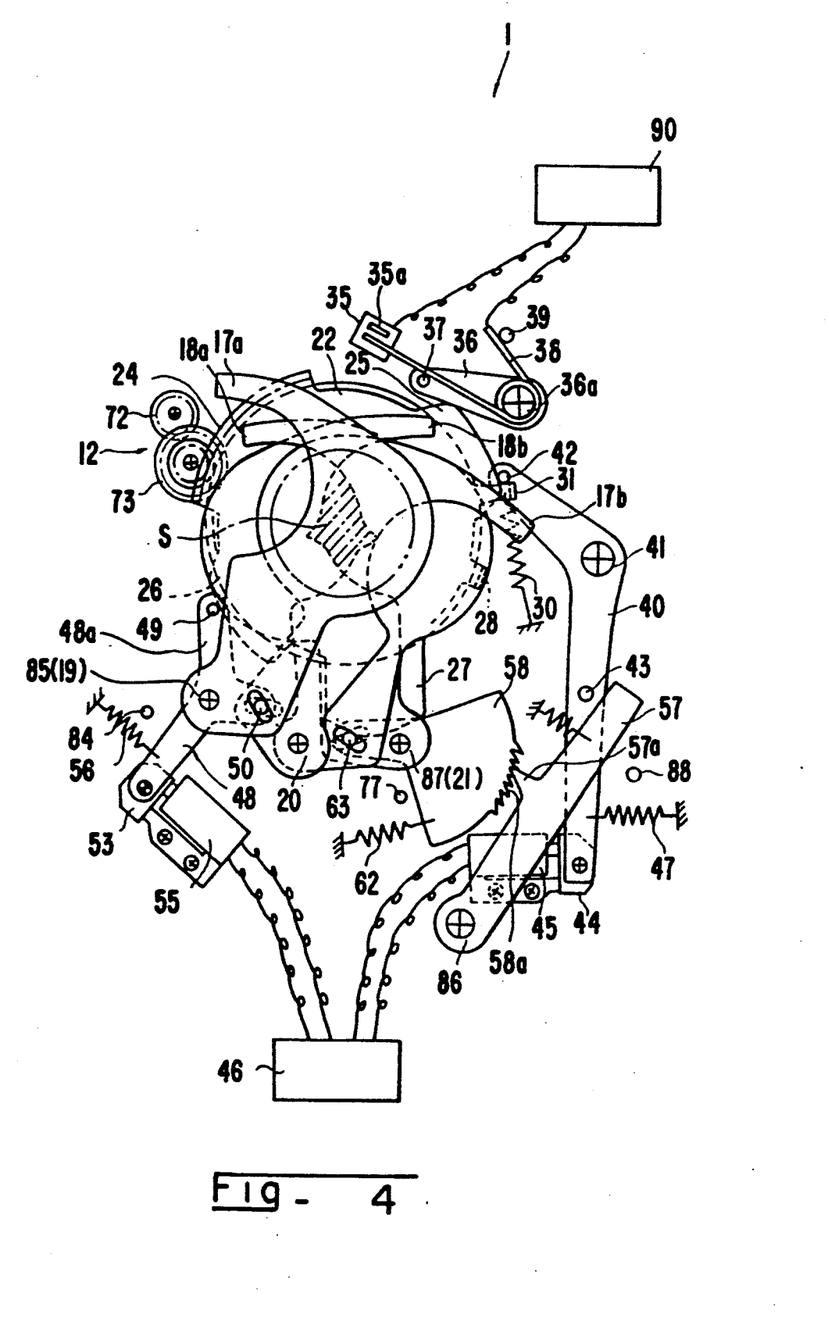

When the rotor 71 is stopped after it rotates by a predetermined number of steps, the second sector mechanism 18 defines an opening (aperture) S corresponding to a desired exposure value, as shown in FIG. 4. The ratchet pawl 57a rides on the ratchet teeth 58a tooth by tooth. When the operational plate 22 stops, the sector association lever 58 is locked at the position of the engagement of the ratchet pawl 57a with one of the ratchet teeth 58a to hold the second sector mechanism 18 at the open position. In this state, since the first sector mechanism 17 is maintained in a closed position, the shutter opening 59a is closed, so that no exposure takes place.

Figure 5:
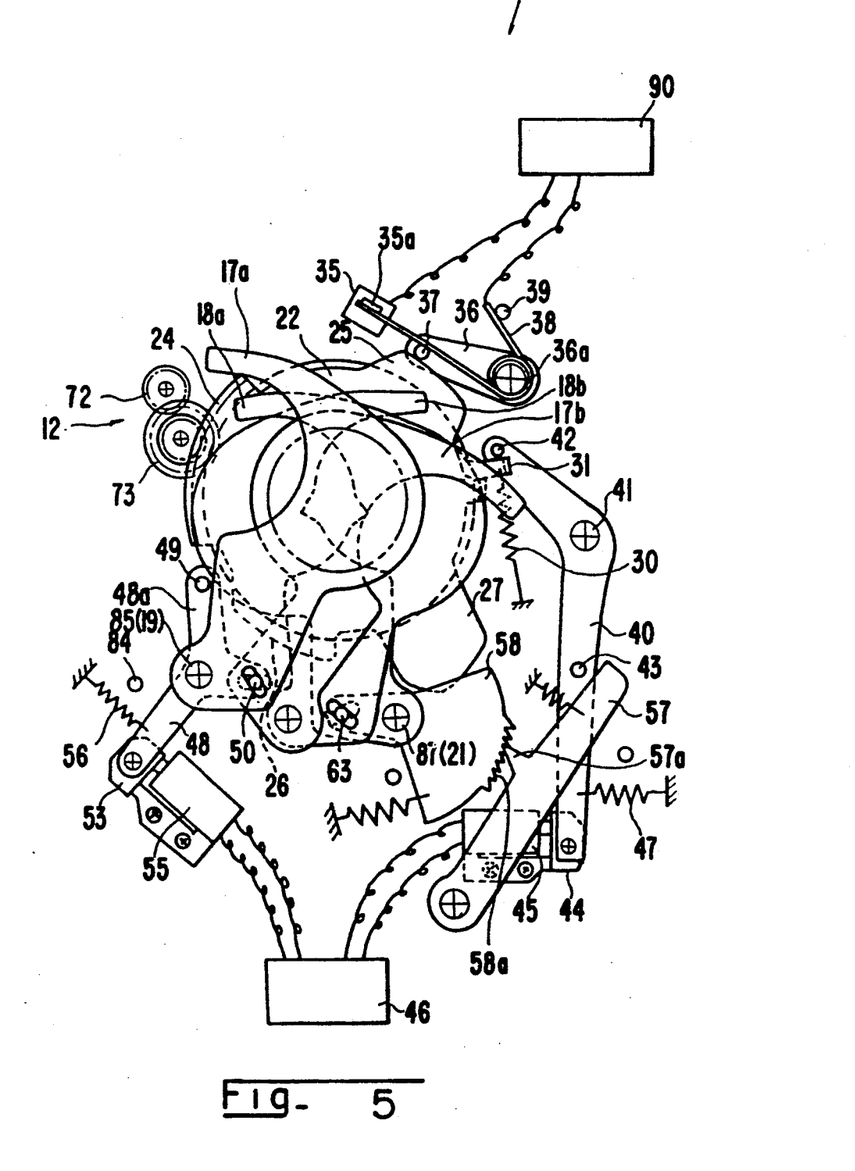

Thereafter, a predetermined number of steps of reverse rotation pulses are generated by the motor drive control circuit 90 to the stepping motor 9 to reverse the rotor 71 in the counterclockwise direction, to thereby to rotate the operational plate 22 in the counterclockwise direction through the reduction gear train 12. As a result, the operational bar 49 is gradually disengaged from the cam portion 26. Nevertheless, no rotation of the sector lever 48 in the clockwise direction occurs, since the armature 53 is attracted by the first electromagnet 55. Thus, the first sector mechanism 17 is kept in the closed position. The cam portion 25 causes the abutment bar 37 to move up to rotate the switch lever 36 in the clockwise direction against the torsion spring 38. Consequently, one end of the torsion spring 38 comes into contact with the terminal 35a of the start switch 35 to turn the start switch 35 ON (FIG. 5). During these operations caused by the rotation of the operational plate 22, the bent portion 28 of the operational plate 22 does not actuate the focus adjusting lens 14, since there is a predetermined distance between the bent portion 28 and the operational lever 31, as mentioned before.

Further rotation of the stepping motor 9 in the counterclockwise direction continues until the number of steps reaches a predetermined value corresponding to the focus position detected by the object distance detecting means 81. As a result, when the bent portion 28 of the operational plate 22 comes into contact with the operational lever 31 from a predetermined angular position, the operation ring 76 begins rotating in the counterclockwise direction. Consequently, the operational lever 31 moves in the elongated holes 92 and 93 of the intermediate frame 5 and the motor mount 6 to rotate the focus adjusting lens 14 in the same direction, so that the focus adjusting lens 14 is advanced to the focus position.

Figure 6:
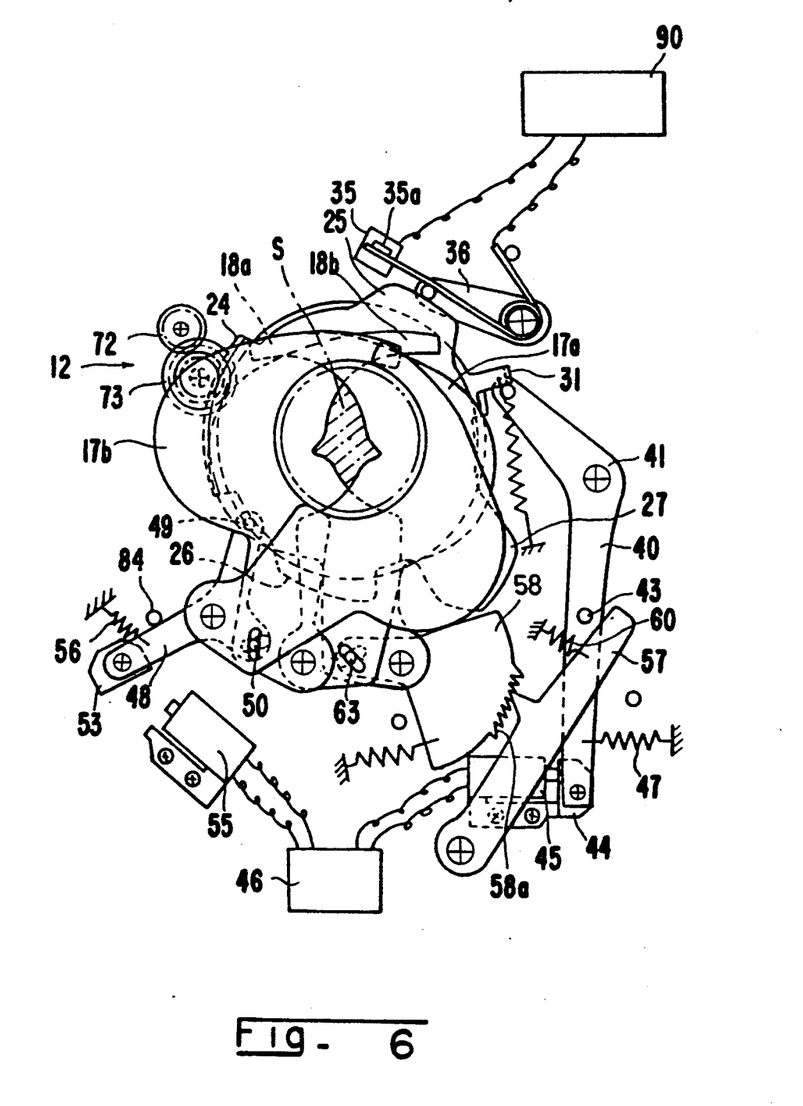

When the focus adjusting lens 14 is moved to the focus position, the stepping motor 9 stops rotating in response to the stop signal from the motor drive control circuit 90. As a result, a signal is issued from the electromagnet control circuit 46 to deenergize the electromagnet 55, to thereby to release the armature 53 and accordingly the sector lever 48. Consequently, the sector lever 48 is rotated in the clockwise direction by the first spring 56 (FIG. 6). The operational bar 50 is moved in the radial and outward direction of the annular base 3 to rotate the sector blades 17a and 17b in the clockwise direction and the counterclockwise direction respectively, so that the first sector mechanism 17 is fully opened. Since the second sector mechanism 18 is opened to a predetermined aperture exposure value), as mentioned above, the exposure can be made through the first and second sector mechanisms 17 and 18.

Figure 7:
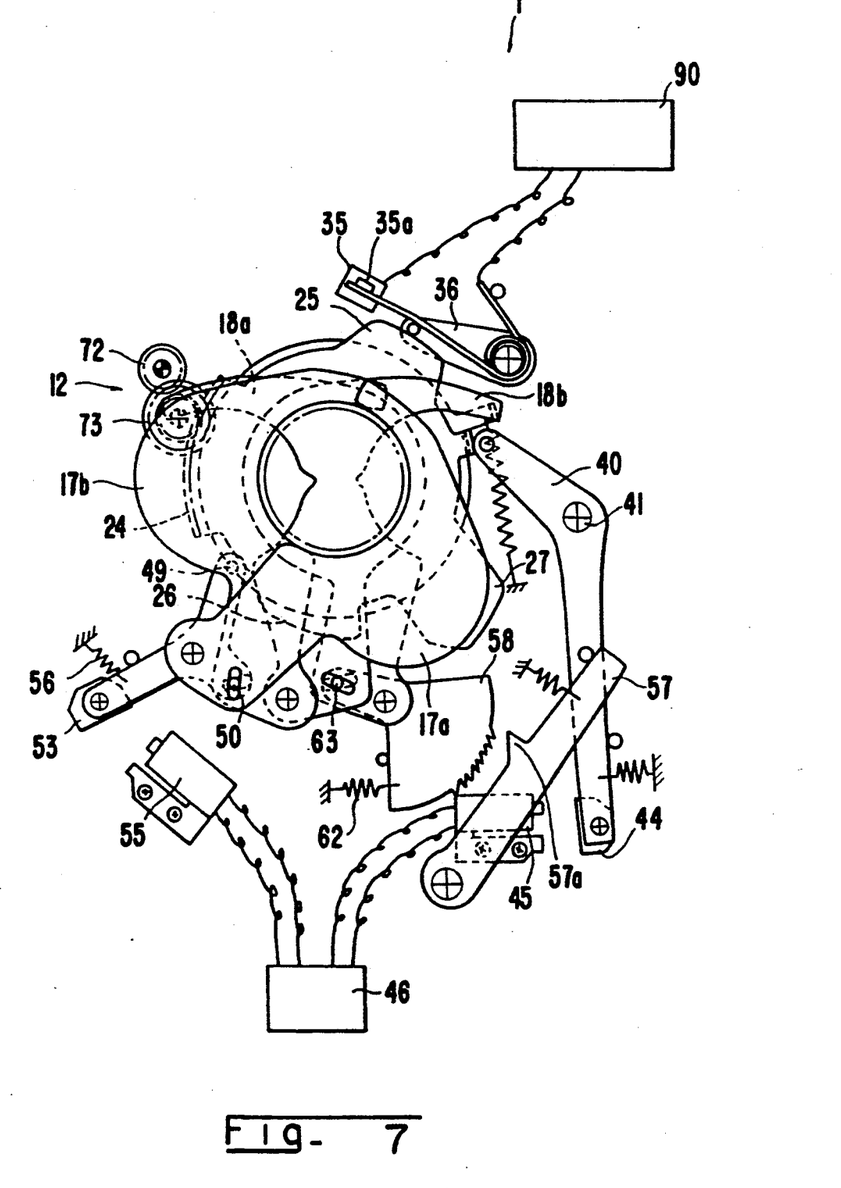
Figure 8:
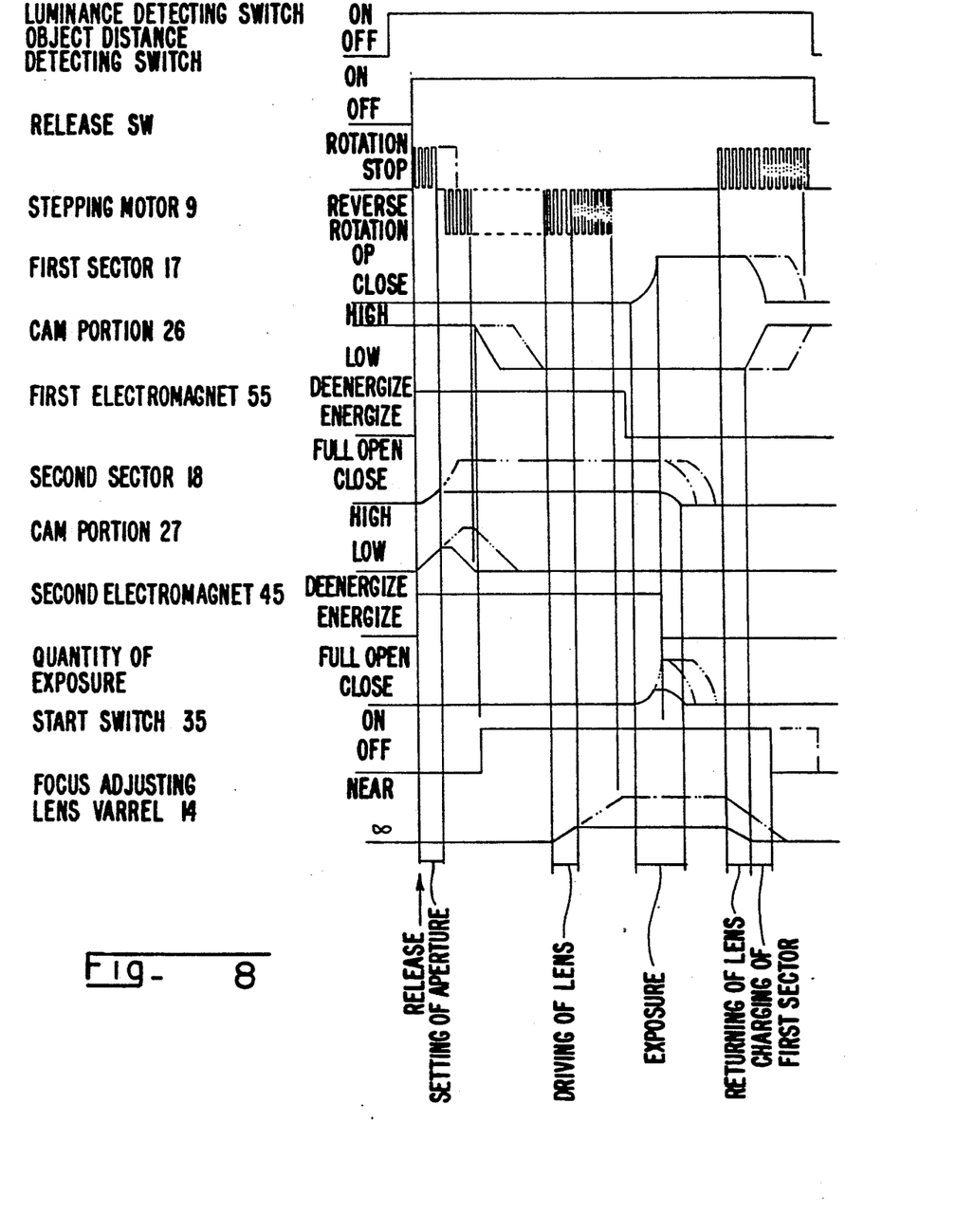

After the lapse of a predetermined time of exposure determined by the photometer means 80, the second electromagnet 45 is deenergized in response to the signal of the electromagnetic control circuit 46, so that the armature 44 and accordingly the lever member 40 are released and rotated in the counterclockwise direction by the spring 47. Since the spring 47 is stronger than the spring 60, the sector association lever 57 is rotated in the clockwise direction via the bias of bar member and against the spring 60. Consequently, the ratchet pawl 57a is disengaged from the ratchet teeth 58a to release the sector association lever 58 (FIG. 7).

As a result, the sector association lever 58 is rotated in the clockwise direction by the second spring 62 until the sector association lever 63 comes into contact with the stop 77. Since the cam portion 27 is retracted from the sector association lever 63 by the rotation of the operational plate 22, the sector association lever 63 is moved in the radial and inward direction along the elongated hole 3b of the annular base 3. As a result, the sector blade 18a and the sector blade 18b are rotated in the counterclockwise direction and the clockwise direction respectively, to close the second sector mechanism 18, so that the exposure through the opening of the first sector mechanism 17 is finished.

After the exposure, the stepping motor 9 rotates in the clockwise direction by a predetermined number of steps of forward rotation pulses from the motor drive control circuit 90 to rotate the operational plate 22 in the clockwise direction, so that the shutter device 1 is returned to the initial position shown in FIG. 3.

I claim:

1. A stepping motor unit comprising:
   an annular motor mount having an inner periphery which defines a center opening and an outer periphery which is spaced from the inner periphery by a constant distance;
   a rotor which is rotatably supported on said annular motor mount; and,
   a pair of stators which are supported on the annular motor mount to cause the rotor to rotate due to a magnetic force, said pair of stators tangentially contacting said inner periphery;
   said stators provided with linear coil holders for holding coils, said stators arranged substantially along said inner and outer peripheries of said motor mount.

2. The stepping motor unit according to claim 1, wherein said stators are located on said annular motor mount without projecting from said inner and outer peripheries of said motor mount.

3. The stepping motor unit according to claim 1, wherein said rotor comprises a cylindrical permanent magnet rotated in accordance with the changes in the magnetic polarity of said stators.

4. The stepping motor unit according to claim 3, wherein said stators have outer contact portions substantially in parallel with the associated said coil holders, so that said outer contact portions of said stators can be directed tangentially towards said center opening of said motor mount.

5. The stepping motor unit according to claim 1, wherein said coil holders have magnetic force generating portions formed at a front end of said holders adjacent to said rotor.

6. The stepping motor unit according to claim 5, further comprising linear bobbins on which said coils are wound, so that said coil holders are inserted in said associated bobbins.

7. The stepping motor unit according to claim 6, wherein said magnetic force generating portions are formed archwise, correspondingly to the circular contour of said rotor.

8. The stepping motor unit according to claim 1, wherein said center opening of said motor mount defines a photographing opening of a camera.

9. The stepping motor unit according to claim 8, wherein said rotor constitutes a lens shutter mechanism which opens and closes said photographing opening.

10. The stepping motor unit according to claim 9, wherein said lens shutter mechanism comprises first and second sector mechanisms which are independently operable, said first sector mechanism being normally closed and being opened after the second sector mechanism is positioned at a predetermined aperture, said second sector mechanism being closed after said first sector mechanism is opened.

11. A stepping motor unit according to claim 10, wherein said first and said second sector mechanisms are actuated by said rotor.

12. A stepping motor unit comprising:
an annular motor mount having an inner periphery which defines a center opening and an outer periphery which is spaced from the inner periphery by a constant distance;
a rotor which is rotatably supported on said annular motor mount; and,
a pair of stators which are supported on said annular motor mount to cause said rotor to rotate due to magnetic force;
said stators mounted on said annular motor mount tangentially contacting said inner periphery without projecting from said inner and outer peripheries of said motor mount.

* * * * *

UNITED STATES PATENT AND TRADEMARK OFFICE
CERTIFICATE OF CORRECTION

PATENT NO. : 5,117,137
DATED : May 26, 1992
INVENTOR(S) : Takumi KOBAYASHI

It is certified that error appears in the above-indentified patent and that said Letters Patent is hereby corrected as shown below:

At column 8, line 64 (claim 6, line 2), insert ---respective--- after "said".

Signed and Sealed this

Twelfth Day of April, 1994

Attest:

BRUCE LEHMAN

Attesting Officer

*Commissioner of Patents and Trademarks*